US012745316B2

(12) United States Patent
Van Phan et al.

(10) Patent No.: US 12,745,316 B2
(45) Date of Patent: Sep. 22, 2026

(54) SL DRX RECONFIGURATION FOR SL GROUPCAST BASED ON CONGESTION CONTROL

(71) Applicant: Nokia Technologies Oy, Espoo (FI)

(72) Inventors: Vinh Van Phan, Oulu (FI); Ling Yu, Espoo (FI); Nuno Manuel Kiilerich Pratas, Aalborg (DK); Prajwal Keshavamurthy, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 208 days.

(21) Appl. No.: 18/686,471

(22) PCT Filed: Oct. 3, 2022

(86) PCT No.: PCT/EP2022/077425
§ 371 (c)(1),
(2) Date: Feb. 26, 2024

(87) PCT Pub. No.: WO2023/066644
PCT Pub. Date: Apr. 27, 2023

(65) Prior Publication Data

US 2025/0081286 A1 Mar. 6, 2025

Related U.S. Application Data

(60) Provisional application No. 63/257,249, filed on Oct. 19, 2021.

(51) Int. Cl.
*H04W 76/28* (2018.01)
*H04W 52/02* (2009.01)
*H04W 72/25* (2023.01)

(52) U.S. Cl.
CPC ....... *H04W 76/28* (2018.02); *H04W 52/0216* (2013.01); *H04W 72/25* (2023.01)

(58) Field of Classification Search
None
See application file for complete search history.

(56) References Cited

U.S. PATENT DOCUMENTS 9,992,744 B2 6/2018 Jha et al.
2017/0339682 A1 11/2017 Lee et al.
(Continued)

FOREIGN PATENT DOCUMENTS

WO 2018/064477 A1 4/2018

OTHER PUBLICATIONS

"WID revision: NR sidelink enhancement", 3GPP TSG RAN Meeting #90e, RP-202846, Agenda Item: 9.8.3, LG Electronics, Dec. 7-11, 2020, 6 pages.

(Continued)

*Primary Examiner* — Gregory B Sefcheck
(74) *Attorney, Agent, or Firm* — Carter, DeLuca & Farrell LLP

(57) ABSTRACT

In a system, apparatus, method, and non-transitory computer readable medium for implementing SL DRX reconfiguration for SL groupcast based on congestion control, a UE device may be caused to, obtain sidelink (SL) groupcast configuration information associated with a desired UE group, the SL groupcast configuration information including a SL discontinuous reception (DRX) cycle and at least one setting rule regarding the SL DRX cycle for the desired UE group, the SL DRX cycle including a SL DRX ON duration setting, determine whether a congestion level of the desired UE group for a current SL DRX cycle period exceeds a desired congestion threshold level, determine SL DRX reconfiguration settings based on results of the determining whether the congestion level exceeds the desired congestion thresh- (Continued)

old level and the setting rule, and perform SL DRX communication based on the determined SL DRX reconfiguration settings.

1 Claim, 6 Drawing Sheets

(56) References Cited

U.S. PATENT DOCUMENTS

| | | | | |
|---|---|---|---|---|
| 2019/0190662 | A1 | 6/2019 | Lee et al. | |
| 2020/0314940 | A1 | 10/2020 | Park et al. | |
| 2021/0127403 | A1 | 4/2021 | Ryu et al. | |
| 2022/0046648 | A1* | 2/2022 | Kiilerich Pratas | H04W 48/16 |
| 2022/0070965 | A1* | 3/2022 | Li | H04W 76/28 |
| 2022/0086803 | A1* | 3/2022 | Li | H04W 72/0453 |
| 2022/0095326 | A1* | 3/2022 | Li | H04W 52/0216 |
| 2022/0191725 | A1* | 6/2022 | Ashraf | H04L 1/1825 |
| 2022/0210864 | A1* | 6/2022 | Park | H04W 40/22 |
| 2022/0256625 | A1* | 8/2022 | Park | H04W 76/14 |
| 2022/0312389 | A1* | 9/2022 | Li | H04W 72/02 |
| 2022/0400469 | A1* | 12/2022 | Li | H04W 74/0808 |
| 2022/0400531 | A1* | 12/2022 | Back | H04W 76/28 |
| 2023/0024646 | A1* | 1/2023 | Park | H04W 76/28 |
| 2023/0032608 | A1* | 2/2023 | Li | H04W 72/52 |
| 2023/0063472 | A1* | 3/2023 | Freda | H04W 52/0229 |
| 2023/0115633 | A1* | 4/2023 | Park | H04W 72/232 370/311 |
| 2023/0180313 | A1* | 6/2023 | Freda | H04W 76/14 370/310 |
| 2023/0284332 | A1* | 9/2023 | Zhang | H04W 76/14 370/328 |
| 2023/0309016 | A1* | 9/2023 | Li | H04W 76/14 |
| 2024/0015767 | A1* | 1/2024 | Back | H04L 5/0055 |
| 2024/0049343 | A1* | 2/2024 | Back | H04W 72/02 |
| 2024/0098815 | A1* | 3/2024 | Freda | H04W 76/14 |
| 2024/0172325 | A1* | 5/2024 | Adjakple | H04W 88/02 |
| 2024/0260126 | A1* | 8/2024 | Park | H04W 72/25 |
| 2024/0349310 | A1* | 10/2024 | Ji | H04W 72/40 |
| 2024/0381483 | A1* | 11/2024 | Park | H04W 72/25 |
| 2024/0389115 | A1* | 11/2024 | Park | H04W 28/0278 |
| 2024/0407044 | A1* | 12/2024 | Back | H04W 72/25 |
| 2025/0374184 | A1* | 12/2025 | Park | H04W 52/0216 |

OTHER PUBLICATIONS

"Congestion Control for Resource Allocation Schemes in NR Sidelink", 3GPP TSG RAN WG2 Meeting #113e, R2-2101303, Agenda item: 8.15.3, Jan. 25-Feb. 5, 2021, 3 pages.

"Summary of [POST113-e][703][V2X/SL] Details of Timer (InterDigital)", 3GPP TSG-RAN WG2 Meeting #113-bis-e, R2-2102801, Agenda: 8.15.2, InterDigital, Apr. 12-20, 2021, pp. 1-67.

"[AT113bis-e][708][V2X/SL] DRX configuration for SL groupcast and broadcast", 3GPP TSG-RAN WG2 Meeting #114 electronic, R2-2105912, Agenda Item: 8.15.2, ZTE, May 19-27, 2021, pp. 1-21.

"3rd Generation Partnership Project; Technical Specification Group Services and System Aspects; Study on architecture enhancements for 3GPP support of advanced Vehicle-to-Everything (V2X) services; Phase 2 (Release 17)", 3GPP TR 23.776, V17.0.0, Mar. 2021, pp. 1-29.

"SL DRX issues", 3GPP TSG-RAN WG2 Meeting #116 Electronic, R2-21xxxxx, Agenda item: 8.15.2, Nokia, Nov. 1-12, 2021, 3 pages.

International Search Report and Written Opinion received for corresponding Patent Cooperation Treaty Application No. PCT/EP2022/077425, dated Feb. 10, 2023, 8 pages.

* cited by examiner

SL DRX RECONFIGURATION FOR SL GROUPCAST BASED ON CONGESTION CONTROL

RELATED APPLICATION

This application claims priority to PCT Patent Application No. PCT/EP2022/077425, filed 3 Oct. 2022, which claims priority from United States of America Application No. 63/257,249, filed on 19 Oct. 2021, which is incorporated herein by reference in its entirety.

BACKGROUND

Field

Various example embodiments relate to methods, apparatuses, systems, and/or non-transitory computer readable media for providing sidelink (SL) discontinuous reception (DRX) for SL groupcast based on congestion controls.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard.

The 5G NR standard provides user equipment (UE) devices (hereinafter referred to as UE devices or UEs) with an ability to perform direct UE to UE communications (e.g., point-to-point communication), referred to as sidelink (SL) communication, without having the communications transmitted to a base station (BS), radio access network (RAN) node, etc. Additionally, a plurality of UE devices may be configured to operate as a UE group, wherein SL communications may be groupcast to the desired UE group (e.g., at least one message is cast to every member UE of the group), instead of individually transmitted individually to each UE member. The 5G NR standard further provides the discontinuous reception (DRX) mode for UE devices using SL communication as well. The DRX mode allows UE devices to perform periodic half-duplex SL communication (e.g., SL transmission or SL reception, etc.) for a desired and/or preconfigured portion of a periodic SL DRX cycle, referred to as an ON duration, an ON period, etc., and to enter a sleep mode by turning off the radio of the UE device for a remaining portion of the periodic SL DRX cycle, e.g., an OFF duration, an OFF period, etc., the sleep mode enabling the UE device to lower energy consumption and/or battery consumption of the UE device.

However, SL communications between UE devices are limited to half-duplex, or in other words, a UE device may only transmit SL messages or receive SL messages during a single SL resource (e.g., a SL slot, etc.). Additionally, in order to increase the energy savings provided by the SL DRX mode, it is desired to set the ON period for the SL DRX cycle to be as short as possible. However, setting the ON duration to a short period increases the congestion levels experienced by the UE devices of the SL group due to collisions of SL transmission from different UE devices (either other UE devices assigned to the SL group and/or other SL UEs assigned to a different SL group but proximate to the UE device, etc.) using the same or overlapping time-frequency resources for SL transmissions assigned to the SL group, and/or due to the half-duplexing issues wherein different UE members of the SL group transmit to the group simultaneously and therefore miss receiving the SL transmission of the other SL group members, etc.

Consequently, the 5G NR implementation of SL DRX may suffer from reliability and/or coverage issues due to SL transmission congestion issues, such as too many UE devices attempting to transmit SL messages during the same SL resource and/or during the configured SL DRX ON period causing collision of SL messages, etc., too many consecutive SL DRX packet failing to be received and/or decoded by a receiving UE device occurring during the SL resource and/or during the configured SL DRX ON period, thereby resulting in the SL message transmission failures, etc. Accordingly, there is a desire to improve the 5G NR implementation of SL DRX communication by adding methods detecting real-time SL DRX congestion issues and/or dynamic SL DRX congestion issues and/or reconfiguring SL DRX configuration settings to address congestion issues faced by a SL group.

SUMMARY

At least one example embodiment relates to a user equipment (UE) device.

In at least one example embodiment, the UE device may include a memory storing computer readable instructions and processing circuitry configured to execute the computer readable instructions to cause the device to, obtain sidelink (SL) groupcast configuration information associated with a desired UE group, the SL groupcast configuration information including a SL discontinuous reception (DRX) cycle and at least one setting rule regarding the SL DRX cycle for the desired UE group, the SL DRX cycle including a SL DRX ON duration setting, the desired UE group including a plurality of UE devices including the UE device, determine whether a congestion level of the desired UE group for a current SL DRX cycle period exceeds a desired congestion threshold level, determine SL DRX reconfiguration settings based on results of the determining whether the congestion level exceeds the desired congestion threshold level and the setting rule, and perform SL DRX communication based on the determined SL DRX reconfiguration settings.

Some example embodiments provide that the device is further caused to determine the SL DRX reconfiguration settings by: increasing a current SL DRX ON duration setting to a new SL DRX ON duration setting for the current SL DRX cycle in response to the congestion level exceeding the desired congestion threshold level, or determining the SL DRX ON duration setting for a next SL DRX cycle based on the setting rule regarding the SL DRX cycle for the desired UE group.

Some example embodiments provide that the setting rule regarding the SL DRX cycle indicates at least one of: setting the SL DRX ON duration setting for the next SL DRX cycle to an initial SL DRX ON duration setting, and maintaining the increased SL DRX ON duration setting for a desired number of next SL DRX cycles.

Some example embodiments provide that the device is further caused to transmit the determined SL DRX reconfiguration settings to the plurality of UE devices of the desired UE group in a layer 1 (L1) sidelink control information (SCI) or in a higher layer signaling message to the desired UE group.

Some example embodiments provide that the SL DRX ON duration includes a plurality of transmission time windows of equal lengths, and the device is further caused to transmit the determined SL DRX reconfiguration settings to the plurality of UE devices of the desired UE group at a desired point in time, the desired point in time being at least one of: an end of a current transmission time window, a beginning of a next transmission time window, an end of a current SL DRX ON duration and before a beginning of a new SL DRX ON duration, and a beginning of a next SL DRX ON duration.

Some example embodiments provide that the device is further caused to determine whether the congestion level of the desired UE group for the current SL DRX cycle period exceeds the desired congestion threshold level by, monitoring reception-related congestion information associated with the plurality of UE devices of the desired UE group, and determining whether the reception-related congestion information exceeds a desired reception-related congestion threshold level.

Some example embodiments provide that the device is further caused to determine whether the reception-related congestion information exceeds the desired reception-related congestion threshold level by: determining whether the reception-related congestion information indicates a number of the UE devices of the desired UE group transmitting simultaneously in a same slot of the current SL DRX ON duration exceeds a desired number of simultaneous SL transmissions in the same slot, or determining whether the reception-related congestion information indicates a desired number of unsuccessful SL receptions has been observed by the UE device during the current SL DRX ON duration.

Some example embodiments provide that the device is further caused to determine whether the congestion level of the desired UE group for the current SL DRX cycle period exceeds the desired congestion threshold level by: monitoring transmission-related congestion information associated with the plurality of UE devices of the desired UE group, or determining whether the transmission-related congestion information exceeds a desired transmission-related congestion threshold level.

Some example embodiments provide that the device is further caused to determine whether the transmission-related congestion information exceeds the desired transmission-related congestion threshold level by: determining whether the transmission-related congestion information indicates a number of hybrid automatic repeat request (HARQ) failures during the current SL DRX ON duration exceeds a desired number of consecutive HARQ failures has been observed by the UE device, or determining whether the transmission-related congestion information indicates consecutive HARQ discontinuous transmissions (DTXs) received from the UE devices of the desired UE group during a failed HARQ process exceeds a desired number of UE devices.

Some example embodiments provide that the device is a coordinating device of the desired UE group, and each UE device of the desired UE group is associated with a dedicated SL resource, and the device is further caused to: monitor SL transmission announcements from at least one transmitting UE device of the desired UE group, the SL transmission announcements transmitted over the dedicated SL resource associated with the at least one transmitting UE device, and determine the congestion level of the desired UE group exceeds the desired congestion threshold level based on a number of received SL announcements exceeding a desired number of received SL announcements.

Some example embodiments provide that the device is a coordinating device of the desired UE group and the desired UE group is associated with a common set of SL resources, and the device is further caused to, monitor SL announcements from at least one transmitting UE device of the desired UE group, the SL announcements transmitted over the common set of SL resources associated with the desired UE group, estimate the congestion level based on a received power level of the monitored SL announcements, and determine the congestion level of the desired UE group exceeds the desired congestion threshold level based on the estimated congestion level.

Some example embodiments provide that the device is a coordinating device of the desired UE group, the desired UE group is associated with a common set of SL resources, the desired UE group including a plurality of sub-groups, each sub-group of the plurality of sub-groups associated with a SL resource of the common set of SL resources, and the device is further caused to, monitor SL announcements from at least one transmitting UE device of each sub-group of the plurality of sub-groups, the SL announcements transmitted over the SL resource associated with each sub-group, respectively, estimate the congestion level for each sub-group based on a received power level of the monitored SL announcements for the SL resource associated with each sub-group, and determine the congestion level of the desired UE group exceeds the desired congestion threshold level based on the estimated congestion levels of the plurality of sub-groups of the desired UE group.

Some example embodiments provide that the device is a coordinating device of the desired UE group, and the device is further caused to, receive SL coordination requests from at least one transmitting UE device of the desired UE group, and determine the congestion level of the desired UE group exceeds the desired congestion threshold level based on the received SL coordination requests.

Some example embodiments provide that the device is further caused to perform SL DRX communication based on the determined SL DRX reconfiguration settings by transmitting the SL DRX communication with a randomized timing during a remaining portion of the SL DRX ON duration setting of the current SL DRX cycle.

Some example embodiments provide that the device is further caused to perform SL DRX communication based on the determined SL DRX reconfiguration settings by, receiving assistance information from a coordinating UE device of the desired UE group, the assistance information including at least one of, a scheduling assignment, a resource pool assignment, and a transmission time window assignment, and transmitting the SL DRX communication during a remaining portion of the SL DRX ON duration setting of the current SL DRX cycle based on the assistance information.

At least one example embodiment relates to method of operating a user equipment (UE) device.

In at least one example embodiment, the method may include obtaining sidelink (SL) groupcast configuration information associated with a desired UE group, the SL groupcast configuration information including a SL discontinuous reception (DRX) cycle and at least one setting rule regarding the SL DRX cycle for the desired UE group, the SL DRX cycle including a SL DRX ON duration setting, the desired UE group including a plurality of UE devices including the UE device, determining whether a congestion level of the desired UE group for a current SL DRX cycle exceeds a desired congestion threshold level, determining SL DRX reconfiguration settings based on results of the determining whether the congestion level exceeds the desired congestion threshold level and the setting rule, and performing SL DRX communication based on the determined SL DRX reconfiguration settings.

Some example embodiments provide that the determining the SL DRX reconfiguration settings further includes: increasing a current SL DRX ON duration setting to a new SL DRX ON duration setting for the current SL DRX cycle in response to the congestion level exceeding the desired congestion threshold level, or determining the SL DRX ON duration setting for a next SL DRX cycle based on the setting rule regarding the SL DRX cycle for the desired UE group.

Some example embodiments provide that the setting rule regarding the SL DRX cycle indicates at least one of: setting a SL DRX ON duration setting for the next SL DRX cycle to an initial SL DRX ON duration setting, and maintaining the increased SL DRX ON duration setting for a desired number of next SL DRX cycles.

Some example embodiments provide that the method further includes transmitting the determined SL DRX reconfiguration settings to the plurality of UE devices of the desired UE group in a layer 1 (L1) sidelink control information (SCI) or in a higher layer signaling message to the desired UE group.

Some example embodiments provide that the SL DRX ON duration includes a plurality of transmission time windows of equal lengths, and the method further includes transmitting the determined SL DRX reconfiguration settings to the plurality of UE devices of the desired UE group at a desired point in time, the desired point in time being at least one of: an end of a current transmission time window, a beginning of a next transmission time window, an end of a current SL DRX ON duration and before a beginning of a new SL DRX ON duration, and a beginning of a next SL DRX ON duration.

At least one example embodiment relates to a user equipment (UE) device.

In at least one example embodiment, the UE device may include means for obtaining sidelink (SL) groupcast configuration information associated with a desired UE group, the SL groupcast configuration information including a SL discontinuous reception (DRX) cycle and at least one setting rule regarding the SL DRX cycle for the desired UE group, the SL DRX cycle including a SL DRX ON duration setting, the desired UE group including a plurality of UE devices including the UE device, determining whether a congestion level of the desired UE group for a current SL DRX cycle period exceeds a desired congestion threshold level, determining SL DRX reconfiguration settings based on results of the determining whether the congestion level exceeds the desired congestion threshold level and the setting rule, and performing SL DRX communication based on the determined SL DRX reconfiguration settings.

Some example embodiments provide that the device includes means for determining the SL DRX reconfiguration settings by: increasing a current SL DRX ON duration setting to a new SL DRX ON duration setting for the current SL DRX cycle in response to the congestion level exceeding the desired congestion threshold level, or determining the SL DRX ON duration setting for a next SL DRX cycle based on the setting rule regarding the SL DRX cycle for the desired UE group.

Some example embodiments provide that the setting rule regarding the SL DRX cycle indicates at least one of: setting the SL DRX ON duration setting for the next SL DRX cycle to an initial SL DRX ON duration setting, and maintaining the increased SL DRX ON duration setting for a desired number of next SL DRX cycles.

Some example embodiments provide that the device includes means for transmitting the determined SL DRX reconfiguration settings to the plurality of UE devices of the desired UE group in a layer 1 (L1) sidelink control information (SCI) or in a higher layer signaling message to the desired UE group.

Some example embodiments provide that the SL DRX ON duration includes a plurality of transmission time windows of equal lengths, and the device includes means for transmitting the determined SL DRX reconfiguration settings to the plurality of UE devices of the desired UE group at a desired point in time, the desired point in time being at least one of: an end of a current transmission time window, a beginning of a next transmission time window, an end of a current SL DRX ON duration and before a beginning of a new SL DRX ON duration, and a beginning of a next SL DRX ON duration.

Some example embodiments provide that the device includes means for determining whether the congestion level of the desired UE group for the current SL DRX cycle period exceeds the desired congestion threshold level by, monitoring reception-related congestion information associated with the plurality of UE devices of the desired UE group, and determining whether the reception-related congestion information exceeds a desired reception-related congestion threshold level.

Some example embodiments provide that the device includes means for determining whether the reception-related congestion information exceeds the desired reception-related congestion threshold level by: determining whether the reception-related congestion information indicates a number of the UE devices of the desired UE group transmitting simultaneously in a same slot of the current SL DRX ON duration exceeds a desired number of simultaneous SL transmissions in the same slot, or determining whether the reception-related congestion information indicates a desired number of unsuccessful SL receptions has been observed by the UE device during the current SL DRX ON duration.

Some example embodiments provide that the device includes means for determining whether the congestion level of the desired UE group for the current SL DRX cycle period exceeds the desired congestion threshold level by: monitoring transmission-related congestion information associated with the plurality of UE devices of the desired UE group, or determining whether the transmission-related congestion information exceeds a desired transmission-related congestion threshold level.

Some example embodiments provide that the device includes means for determining whether the transmission-related congestion information exceeds the desired transmission-related congestion threshold level by: determining whether the transmission-related congestion information indicates a number of hybrid automatic repeat request (HARQ) failures during the current SL DRX ON duration exceeds a desired number of consecutive HARQ failures has been observed by the UE device, or determining whether the transmission-related congestion information indicates consecutive HARQ discontinuous transmissions (DTXs) received from the UE devices of the desired UE group during a failed HARQ process exceeds a desired number of UE devices.

Some example embodiments provide that the device is a coordinating device of the desired UE group, and each UE device of the desired UE group is associated with a dedicated SL resource, and the device includes means for: monitoring SL transmission announcements from at least one transmitting UE device of the desired UE group, the SL transmission announcements transmitted over the dedicated SL resource associated with the at least one transmitting UE device, and determining the congestion level of the desired UE group exceeds the desired congestion threshold level based on a number of received SL announcements exceeding a desired number of received SL announcements.

Some example embodiments provide that the device is a coordinating device of the desired UE group and the desired UE group is associated with a common set of SL resources, and the device includes means for, monitoring SL announcements from at least one transmitting UE device of the desired UE group, the SL announcements transmitted over the common set of SL resources associated with the desired UE group, estimating the congestion level based on a received power level of the monitored SL announcements, and determining the congestion level of the desired UE group exceeds the desired congestion threshold level based on the estimated congestion level.

Some example embodiments provide that the device is a coordinating device of the desired UE group, the desired UE group is associated with a common set of SL resources, the desired UE group including a plurality of sub-groups, each sub-group of the plurality of sub-groups associated with a SL resource of the common set of SL resources, and the device includes means for, monitoring SL announcements from at least one transmitting UE device of each sub-group of the plurality of sub-groups, the SL announcements transmitted over the SL resource associated with each sub-group, respectively, estimating the congestion level for each sub-group based on a received power level of the monitored SL announcements for the SL resource associated with each sub-group, and determining the congestion level of the desired UE group exceeds the desired congestion threshold level based on the estimated congestion levels of the plurality of sub-groups of the desired UE group.

Some example embodiments provide that the device is a coordinating device of the desired UE group, and the device includes means for, receiving SL coordination requests from at least one transmitting UE device of the desired UE group, and determining the congestion level of the desired UE group exceeds the desired congestion threshold level based on the received SL coordination requests.

Some example embodiments provide that the device includes means for performing SL DRX communication based on the determined SL DRX reconfiguration settings by transmitting the SL DRX communication with a randomized timing during a remaining portion of the SL DRX ON duration setting of the current SL DRX cycle.

Some example embodiments provide that the device includes means for performing SL DRX communication based on the determined SL DRX reconfiguration settings by, receiving assistance information from a coordinating UE device of the desired UE group, the assistance information including at least one of, a scheduling assignment, a resource pool assignment, and a transmission time window assignment, and transmitting the SL DRX communication during a remaining portion of the SL DRX ON duration setting of the current SL DRX cycle based on the assistance information.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
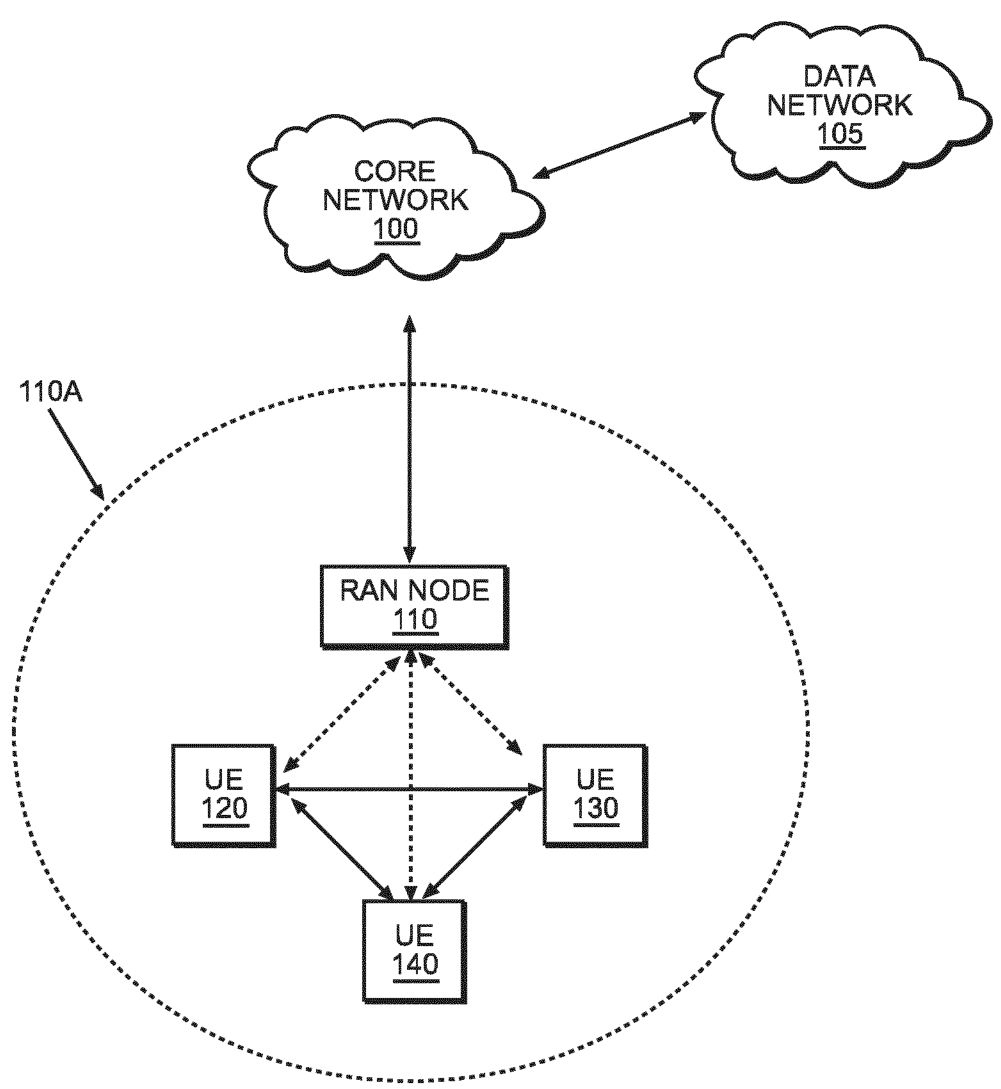
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Various example embodiments are directed towards enhancements to SL DRX configuration to improve the power savings of UE devices operating in SL DRX mode while also improving the reliability of SL communications by dynamically adjusting SL DRX configuration to compensate for communication congestion detected by at least one of the UE devices of a SL group (e.g., SL DRX group, UE group, etc.). More specifically, according to at least one example embodiment, the ON period of the current SL DRX cycle and/or future SL DRX cycle(s) may be dynamically increased to accommodate real-time congestion levels experienced by the SL group, thereby improving and/or optimizing the reliability of SL communications while maintaining the power savings for the UE devices operating in the SL DRX mode. Additionally, according to some example embodiments, the dynamically adjusted SL DRX configuration settings and/or SL DRX reconfiguration settings may be applied to other UE groups, and for example, may be applied to other SL DRX groups operating on a wireless network based on quality of service (QOS) levels, etc., but the example embodiments are not limited thereto.

FIG. 1 illustrates a wireless communication system according to at least one example embodiment. As shown in FIG. 1, a wireless communication system includes a core network 100, and a Data Network 105, a first radio access network (RAN) node 110, a first user equipment device (e.g., UE device or UE, etc.) 120, a second UE device 130, and/or a third UE device 140, etc., but the example embodiments are not limited thereto and the example embodiments may include a greater or lesser number of constituent elements. For example, the wireless communication system may include two or more RAN nodes, one or two UE devices, four or more UE devices, additional base stations, routers, access points, gateways, etc.

The RAN node 110, the UE device 120, the UE device 130, and/or the UE device 140 may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WiFi network, etc.). The wireless network may include a core network 100 and/or a Data Network 105. The RAN node 110 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN node 110 may act as a relay node (e.g., an integrated access and backhaul (IAB) node) and may communicate with the UE devices 120, 130, and/or 140, etc., in combination with at least one base station (and/or access point (AP), router, etc.) (not shown) of the same or a different radio access technology (e.g., WiFi, etc.).

The UE devices 120, 130, and/or 140, etc., may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE devices 120, 130, and/or 140, etc., may be configurable to transmit and/or receive data in accordance to strict latency, reliability, and/or accuracy requirements, such as SL DRX communications, URLLC communications, TSC communications, etc., but the example embodiments are not limited thereto.

According to at least one example embodiment, the UE devices 120, 130, and/or 140 may be members of an SL group and/or UE group and may be configured to perform SL communication during a SL DRX cycle set for the SL group in a SL DRX configuration. According to at least one example embodiment, the SL DRX cycle may be configured to last for a desired period of time and may include at least one ON period (e.g., SL DRX ON period, ON duration, etc.) during which the one or more UE devices may perform SL transmission and/or SL reception, and at least one OFF period (e.g., SL DRX OFF period, OFF duration, etc.) during which the one or more UE devices are in a sleep mode, e.g., the UE devices have their wireless radio units powered off and/or do not perform SL transmission and/or reception, etc. Additionally, the ON period(s) and the OFF period(s) of the SL DRX cycle may be set to a desired period of time. Moreover, the ON period may be further subdivided (and/or segmented, etc.) into equal time intervals referred to as T(k) periods of time (e.g., each T(k) period includes a desired and/or predefined number of consecutive sub-frames and/or slots of the ON period, etc.), where k is an integer (e.g., T(1), T(2), T(3), etc.), but the example embodiments are not limited thereto. According to at least one example embodiment, the SL DRX configuration settings (e.g., initial SL DRX configuration settings, network SL DRX configuration settings, SL DRX configuration, SL groupcast configuration information, etc.), such as the length and/or duration of the SL DRX cycle, the ON period, and/or T(k) intervals may be set by the RAN node 110, the core network 100, and/or the wireless network operator, etc., a coordinating UE device of the SL group, and/or negotiated by (e.g., voted on) by members of the SL group, etc., but the example embodiments are not limited thereto. Additionally, according to some example embodiments, the SL DRX configuration settings may be common across different SL groups, and for example, may be adjusted and/or derived based on the QoS level of the different SL groups (e.g., different SL groups with the same and/or similar QoS level may be configured to use the same SL DRX configuration settings), etc., but the example embodiments are not limited thereto.

According to at least one example embodiment, at least one UE device, such as the UE device 120, may be a receiving (RX) UE device (e.g., a UE device performing SL reception during the ON period of the current SL DRX cycle), at least one UE device, such as the UE device 130, may be a transmitting (TX) UE device (e.g., a UE device performing SL transmission during the ON period of the current SL DRX cycle), and/or at least one UE device, such as UE device 140, may be a coordinating (CO) UE device (e.g., a UE device configured to act as a coordinator and/or lead UE device for the SL group), but the example embodiments are not limited thereto. For example, in at least one example embodiment, the CO UE device, the RX UE device, and/or TX UE device may be omitted from the SL group, and/or two or more of the UE devices may act as RX UE devices, TX UE devices, and/or CO UE devices, etc., but the example embodiments are not limited thereto. It is noted that a UE device of the SL group may operate as a TX UE or a RX UE from time to time during the same ON period of a desired SL DRX cycle (e.g., a current SL DRX cycle, etc.) for SL communication of the SL group. That is, when the UE device has data to send to the SL group it may operate as a TX UE to send the data to the SL group; otherwise it may act as a RX UE to receive data from other member(s) of the SL group during the ON period of the desired and/or current SL DRX cycle, etc., but the example embodiments are not limited thereto.

Moreover, according to some example embodiments, at least one UE device of a SL group may determine and/or detect congestion levels of the SL group during a current SL DRX cycle. According to some example embodiments, the UE device(s) determining the congestion level may be the at least one RX UE device 120, the at least one TX UE device 130, and/or the CO UE device 140, etc. In at least one example embodiment, the at least one UE device determining the congestion level may also determine SL DRX reconfiguration settings, e.g., dynamic adjustments to the initial SL DRX configuration settings, and transmit the SL DRX reconfiguration settings to the other UE devices of the SL group. Additionally, according to some example embodiments, a plurality of UE devices may determine the congestion level of the SL group, may determine the SL DRX reconfiguration settings, and may transmit the SL DRX reconfiguration settings to the other members of the SL group. In this case, according to at least one example embodiment, each of the UE devices of the SL group may receive the plurality of SL DRX reconfiguration settings and may then select the SL DRX reconfiguration which includes the longest SL DRX ON duration for the current SL DRX cycle, etc., but the example embodiments are not limited thereto. For example, according to some example embodiments, if one or more UE devices of an SL group receives conflicting SL DRX reconfiguration settings from two or more congestion detection UE devices of the SL group during a desired and/or current SL DRX cycle, the one or more UE devices may apply setting rules included in the SL DRX configuration settings and/or SL DRX reconfiguration settings to arbitrate the conflicting SL DRX reconfiguration settings, etc., but the example embodiments are not limited thereto. The methods of determining the congestion levels and/or determining the SL DRX reconfiguration settings will be discussed in further detail in connection with FIGS. 5-7.

The wireless communication system further includes at least one RAN node (e.g., a base station, a wireless access point, etc.), such as RAN node 110, etc. The RAN node 110, etc., may operate according to an underlying cellular and/or wireless radio access technology (RAT), such as 5G NR, LTE, Wi-Fi, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within one or more cells (e.g., cell service areas, broadcast areas, serving areas, coverage areas, etc.) surrounding the respective physical location of the RAN node, such as a cell 110A surrounding the RAN node 110, etc.

For example, UE devices 120, 130, and/or 140 are located within the cell service area 110A, and may connect to, receive broadcast messages from, receive paging messages from, receive/transmit signaling messages from/to, and/or access the wireless network through, etc., RAN node 110 (e.g., the source RAN node serving the UE device, etc.), but the example embodiments are not limited thereto.

While FIG. 1 illustrates a single cell for the RAN node 110, the example embodiments are not limited thereto, and for example, the RAN node may provide a plurality of cells, etc.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
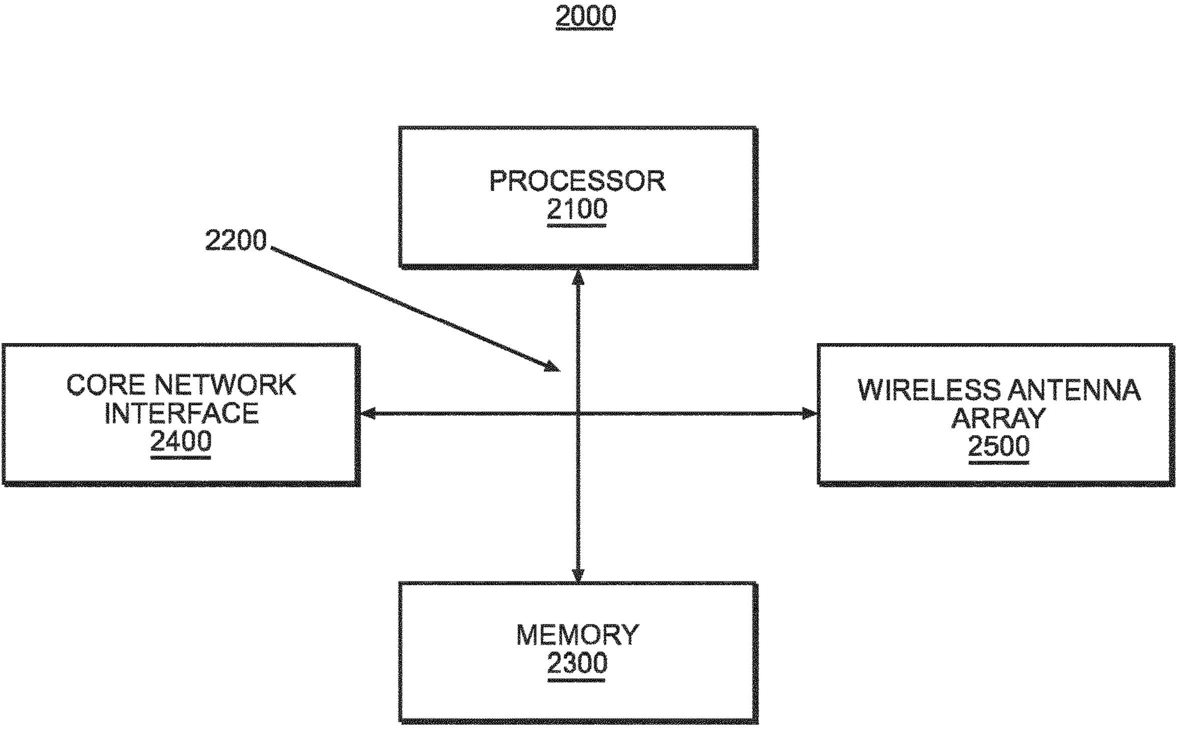
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN node 110 of FIG. 1, but the example embodiments are not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 5 to 7, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule time domain resource allocations (TDRAs), e.g., orthogonal frequency division multiplexing (OFDM) symbols, physical resource blocks (PRBs), resource elements, etc., for UE devices connected to the RAN node 2000, but the example embodiments are not limited thereto.

For example, the RAN node 2000 may allocate time-frequency resources of a carrier (e.g., resource blocks with time and frequency dimensions) based on operation on the time domain (e.g., time division duplexing) and/or the frequency domain (e.g., frequency division duplexing). In the time domain context, the RAN node 2000 will allocate a carrier (or subbands of the carrier) to one or more UEs (e.g., UE 120, etc.) connected to the RAN node 2000 during designated upload (e.g., uplink (UL)) time periods and designated download (e.g., downlink (DL)) time periods, or during designated special(S) time periods which may be used for UL and/or DL, but the example embodiments are not limited thereto.

When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the RAN node 2000 may transmit scheduling information via physical downlink common channel (PDCCH) information to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. Additionally, the RAN node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
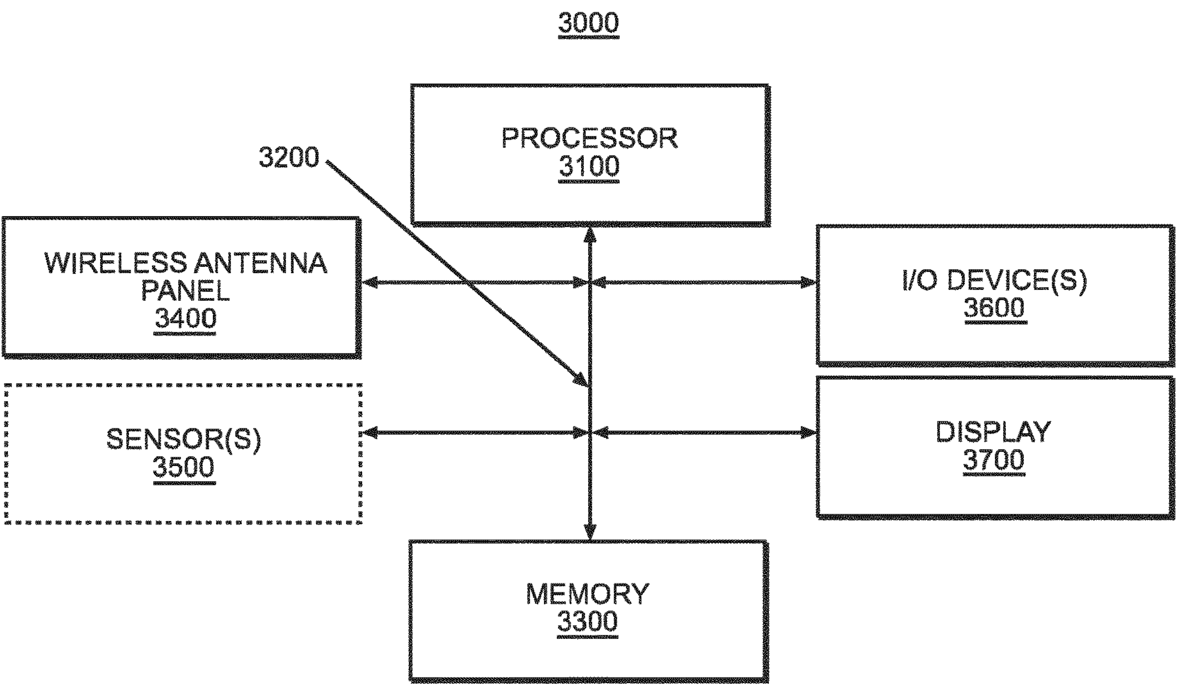
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to one or more of the UE devices 120, 130, and 140 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include at least one sensor 3500, such as one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), a battery, actuators, a single wireless antenna and/or a single wireless antenna panel, etc. Additionally, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 5 to 7, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, resource block scheduling, etc., for communicating with at least one RAN node, e.g., RAN node 110, etc., accessing a wireless network, etc., but the example embodiments are not limited thereto.

In at least one example embodiment, the at least one communication bus 3200 may enable communication and data transmission/reception to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. Additionally, the at least one wireless antenna panel 3400 may be configured to transmit and/or receive SL communications from one or more UE devices, etc., on one or more SL resources, such as a physical sidelink feedback channel (PSFCH), a physical sidelink control channel (PSCCH), a physical sidelink shared channel (PSSCH), and/or SL slots, etc., assigned to an associated SL group, but the example embodiments are not limited thereto. Additionally, a first UE device may act as a relay for at least one second UE device, for example, wherein the first UE device receives data destined for the at least one second UE device from the RAN node 110, and then forwards the received data to the at least one second UE device, etc., thereby improving the reliability of wireless transmission and/or extending the range of wireless transmissions, but the example embodiments are not limited thereto. For example, there may be more than one relay UE device, the relay UE device may receive data from a UE device destined for the RAN node and/or core network, etc. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

According to some example embodiments, the UE 3000 may measure one or more radio signal power and/or signal quality metrics using the at least one wireless antenna panel 3400 corresponding to SSB and/or CSI-RS signals transmitted by one or more RAN nodes, such as a source RAN node (e.g., RAN node 110) and/or one or more target RAN nodes (e.g., RAN nodes 111 and/or 112, etc.), but the example embodiments are not limited thereto. More specifically, the UE 3000 may measure radio signal power and/or cell quality metrics such as reference signal received power (RSRP) (e.g., SS-RSRP and/or CSI-RSRP, etc.), reference signal received quality (RSRQ) (e.g., SS-RSRQ and/or CSI-RSRQ, etc.), received signal strength indicator (RSSI) (e.g., NR-RSSI, CSI-RSSI, etc.), signal to interference and noise ratio (SINR) (e.g., SS-SINR, CSI-SINR), etc., but the example embodiments are not limited thereto. Additionally, the UE 3000 may also measure SL DRX congestion levels by measuring the received power levels of SL messages on one or more SL resource, such as at least one PSFCH and/or at least one SL slot assigned to the SL group, at least one sub-channel of a PSFCH, a mini-slot of the SL slot, etc., but the example embodiments are not limited thereto.

While FIG. 3 depicts an example embodiment of a UE 3000, the UE device is not limited thereto, and may include additional and/or alternative architectures that may be suitable for the purposes demonstrated.

Figures 4, 5:
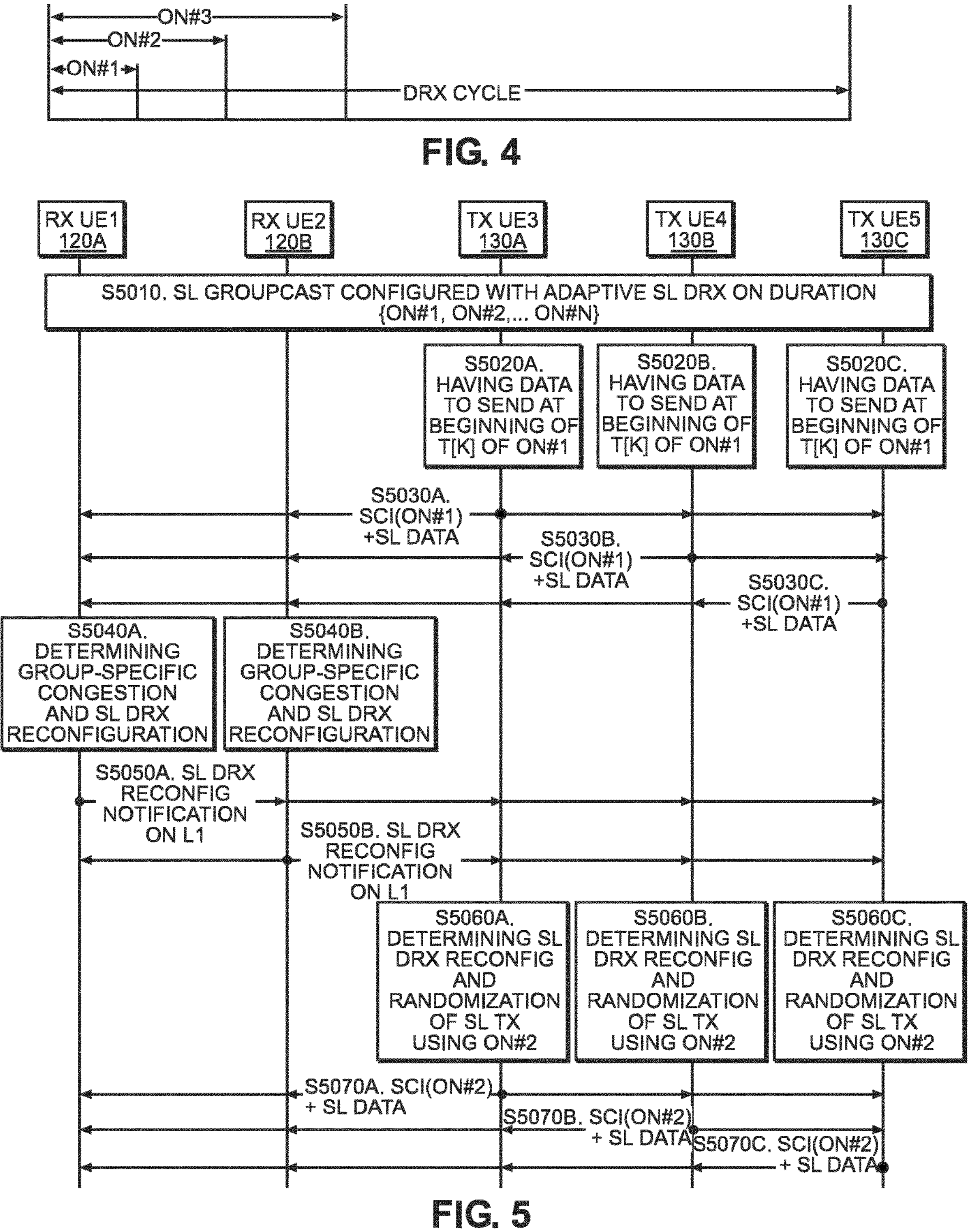
FIG. 4 illustrates an example DRX cycle according to at least one example embodiment.
FIGS. 5 to 7 illustrate example transmission flow diagrams according to some example embodiments.

FIG. 4 illustrates an example DRX cycle according to at least one example embodiment according to at least one example embodiment. FIG. 5 illustrates an example transmission flow diagram for using a RX UE device to determine SL congestion levels and/or determine SL DRX reconfiguration settings for a distributed control and/or inter-coordination SL group according to at least one example embodiment.

Figure 6:
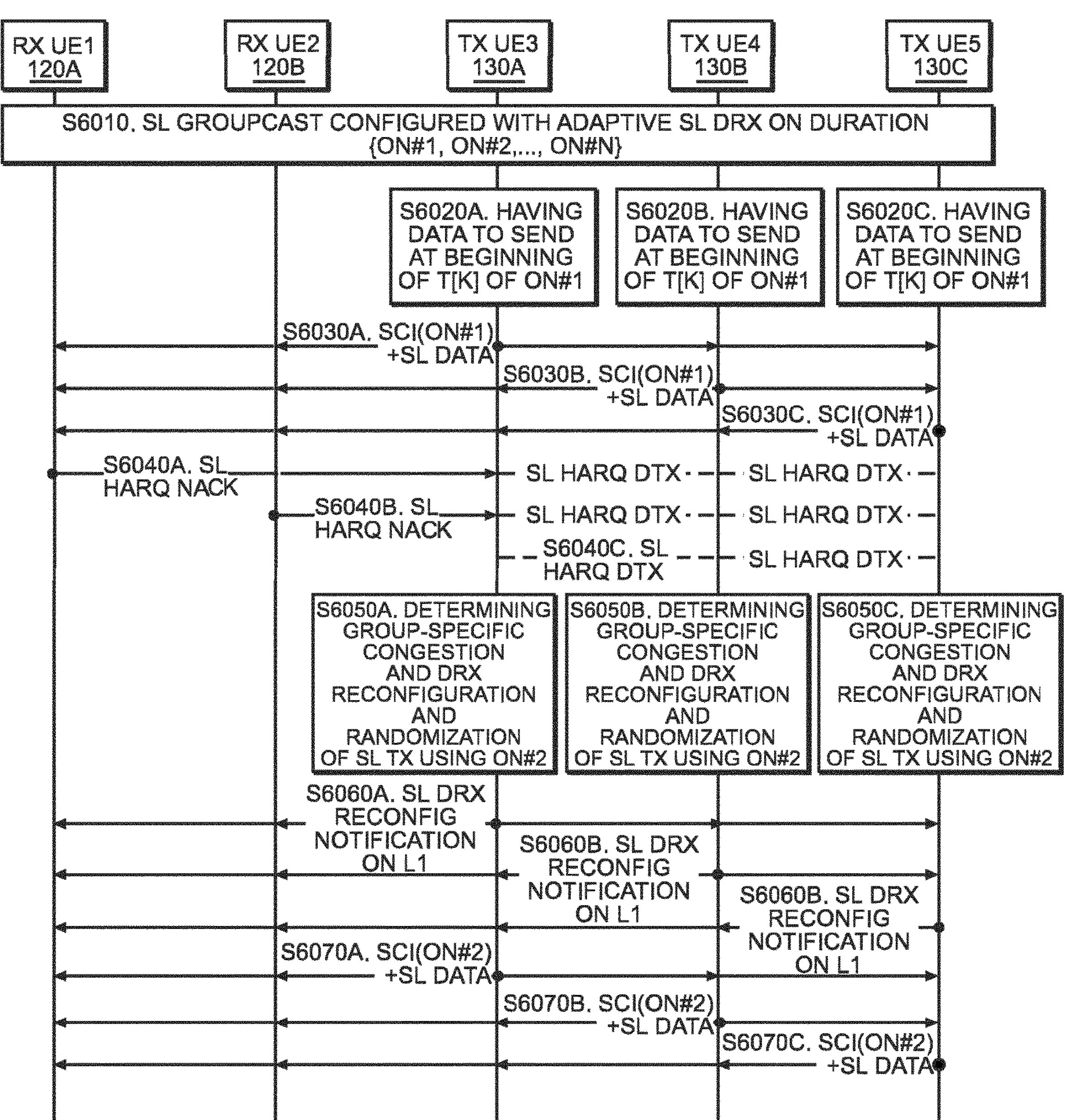
Figure 7:
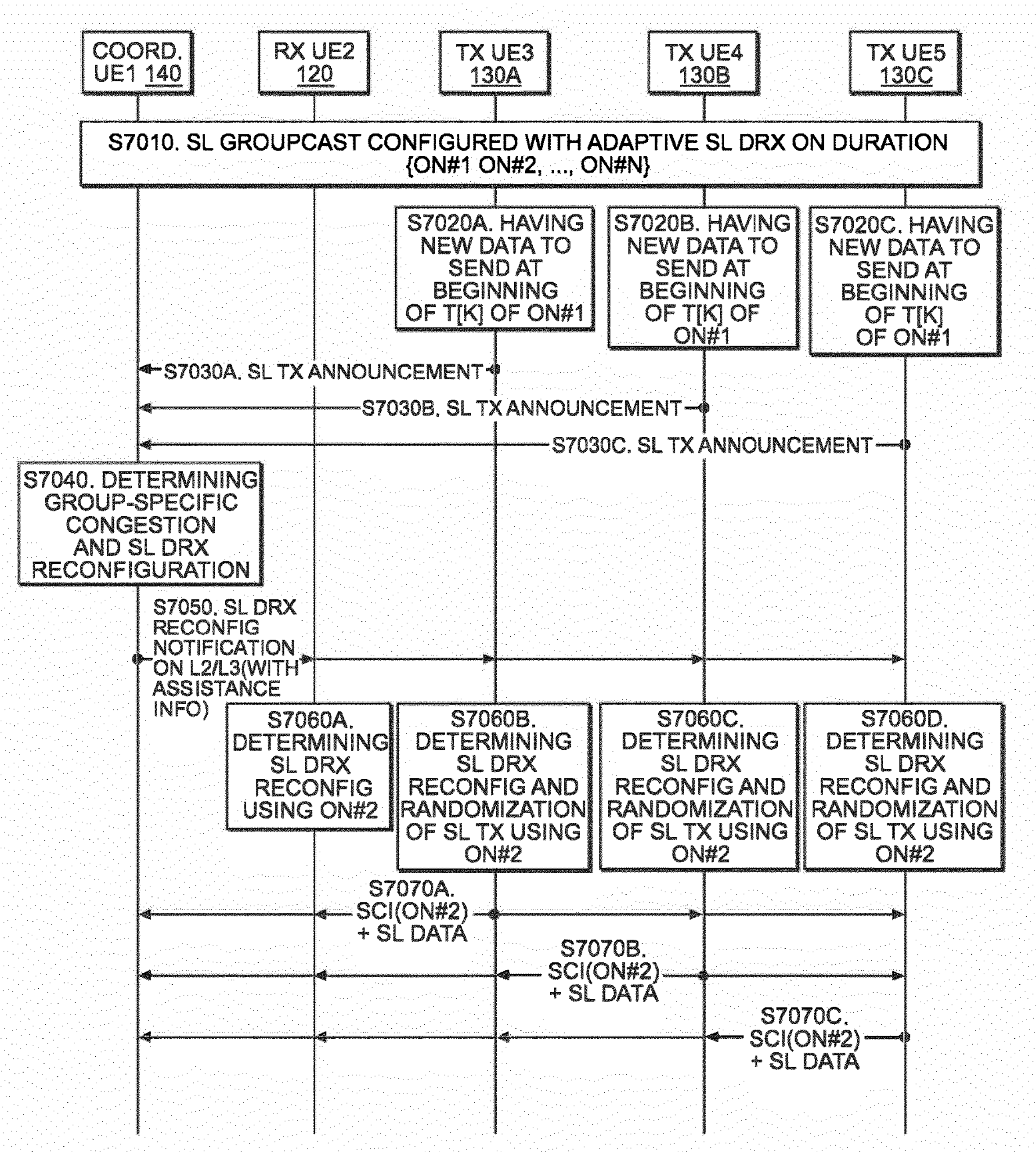

Referring now to FIG. 5, FIG. 5 is an example transmission flow diagram illustrating SL communication between a first RX UE device 120A, a second RX UE device 120B, a first TX UE device 130A, a second TX UE device 130B, and a third TX UE device 130C according to at least one example embodiment, but the example embodiments are not limited thereto, and for example, may include a greater or lesser number of RX and/or TX UE devices, etc. In the discussion of FIGS. 5 to 7, it will be assumed that the plurality of UE devices are assigned to the same SL group, but the example embodiments are not limited thereto, and in some other example embodiments, the disclosed methods may be further applied to a plurality of UE devices assigned to a plurality of different SL groups which use a common set of SL groupcast configuration information (e.g., different SL groups with the same or similar QoS level, etc.), etc. For example, the initial SL groupcast configuration information (e.g., initial SL DRX configuration information, SL DRX configuration, etc.) and/or new and/or modified SL DRX reconfiguration information (e.g., SL DRX reconfiguration settings, etc.) may be transmitted to the UE devices of a plurality of SL groups by at least one RAN node, at least one UE device, etc., and may be assigned based on a same QoS class assigned to each of the SL groups, etc., but the example embodiments are not limited thereto.

According to at least one example embodiment, in operation S5010, the plurality of UE devices of a desired SL groupcast group (e.g., a SL group, a UE group, etc.), such as UE devices 120A, 120B, 130A, 130B, and/or 130C, may obtain, receive, and/or be configured with initial and/or default SL groupcast configuration information from a RAN node, such as RAN node 110, and/or the core network, e.g., core network 100, and/or obtain and/or be pre-configured (e.g., pre-loaded, etc.) with the initial and/or default SL groupcast configuration information, etc., but the example embodiments are not limited thereto. According to some example embodiments, the initial SL groupcast configuration information may include configuration settings and/or parameters related to the SL groupcast group, such as a SL groupcast identifier (e.g., Group ID, etc.), an initial SL DRX configuration setting (e.g., the length and/or duration of a SL DRX cycle, the initial length and/or duration of the SL DRX ON period of the SL DRX cycle, the initial length and/or duration of at least one T(k) periods (e.g., sub-ON periods, etc.) of the ON period, the initial length and/or duration of the SL DRX OFF period, the SL resources assigned to the SL DRX group, the QoS parameters (e.g., PC5 QoS identifier (PQI) parameters, etc.) assigned to the SL DRX group, e.g., reliability requirements, latency values, etc., and desired congestion threshold values, etc., but the example embodiments are not limited thereto. For example, in some example embodiments, as shown in FIG. 4, the SL groupcast configuration information (e.g., SL DRX configuration) may further include information regarding setting rules for SL DRX reconfiguration, such as desired transmission-related and/or reception-related congestion threshold levels, etc., information regarding extended SL DRX ON periods, such as an optional extended ON period #2, an optional extended ON period #3, etc., which may be longer than the initial ON period (e.g., ON period #1), an identifier identifying the CO UE device of the SL group, rules related to resolution of conflicting SL DRX reconfiguration settings received from two or more congestion detecting UE devices, etc., but the example embodiments are not limited thereto, and for example, the number of extended ON periods may be greater or less than two, etc. Additionally, according to some example embodiments, the setting rules further specify whether and/or how the SL DRX reconfiguration settings for the current SL DRX cycle may be applied for next and/or future SL DRX cycle(s), etc.

In operations S5020A to S5020C, at least one of the UE devices of a SL group, e.g., TX UE devices 130A to 130C of FIG. 5, may determine that it has new data to transmit to the members of the SL group at the beginning of a next T(k) period, e.g., T(1), of a current ON period of a current SL DRX cycle, but the example embodiments are not limited thereto.

In operations S5030A to S5030C, at the beginning of the next T(k) period, e.g., T(1), of the current ON period of the current SL DRX cycle, the at least one of the TX UE devices 130A to 130C may transmit (e.g., groupcast) sidelink control information (SCI) and the SL data to the SL group, e.g., to all of the RX UE devices of the SL group, e.g., RX UE devices 120A and 120B in FIG. 5, as well as all of the other TX UE devices of the SL group, etc., but the example embodiments are not limited thereto. However, assuming that each of the TX UE devices 130A to 130C transmit their respective SCI and SL data simultaneously, based on the half-duplex nature of SL transmissions, the other TX UE devices will miss receiving the SL communications from each other, etc., but the example embodiments are not limited thereto. Moreover, the SCI may include all scheduling information desired and/or needed for receiving and/or decoding the SL data, etc., but the example embodiments are not limited thereto. That is, the SCI may be used for scheduling the transmission of the SL data. In addition, the SCI may include an indication of the current ON period, etc. For example, the SCI of NR SL includes a first-stage SCI sent on a Physical Sidelink Control Channel (PSCCH) and/or a second-stage SCI sent on Physical Sidelink Shared Channel (PSSCH) together with the SL data, etc., but the example embodiments are not limited thereto.

In at least one other example embodiment, the plurality of TX UE devices 130A to 130C may randomly select one of the plurality of SL resources assigned to the SL group on which to transmit the SCI and the SL data, but the example embodiments are not limited thereto. Additionally, the SL resources assigned to the SL group here may be from a shared resource pool commonly configured for SL transmissions, etc., but the example embodiments are not limited thereto.

In operations S5040A and S5040B, the RX UE devices 120A and 120B may monitor, measure and/or determine the congestion level for the SL group (e.g., determine group-specific congestion levels, etc.) by monitoring reception-related congestion information, etc., and then determine whether the congestion level exceeds one or more desired congestion threshold levels for the current ON period based on the setting rule(s) regarding the SL DRX reconfiguration for the desired SL group, etc. For example, the RX UE devices 120A and 120B may monitor the SCI transmitted by the TX UEs 130A to 130C and/or the RX UE devices' respective SL reception status, etc., but the example embodiments are not limited thereto. As a first example, the RX UE devices 120A and 120B will each individually determine, based on its respective SL reception status, whether there have been a number of unsuccessful SL receptions of SL transmissions from TX UE device(s) of the SL group and whether the number of unsuccessful SL receptions exceeds a desired threshold number of unsuccessful SL receptions during a single SL DRX ON period, etc. As a second example, each of the RX UE devices 120A and 120B may determine whether the number of TX UEs of the SL group that have simultaneously transmitted using the same SL resource at least in time domain (e.g., in the same time slot(s) of the current SL DRX ON period) exceeds a desired threshold number of TX UEs of the SL group attempting to simultaneously transmit using the same SL resource of a single SL DRX ON period based on the SCI received from the TX UEs, etc. However, the example embodiments are not limited thereto, and other congestion measurements may be taken by the RX UE devices and/or other threshold levels may be used. Additionally, the values for the desired threshold settings may be determined based on, for example, at least one of the channel busy ratio (CBR) of the SL resources (e.g., shared resource pools), the group size of the SL group, the remaining duration of the current ON period, the QoS parameters assigned for the SL group, etc., or any combinations thereof, but the example embodiments are not limited thereto.

In the event that either of the RX UE devices 120A and 120B determine that the current congestion level for the SL group exceeds at least one of the desired congestion threshold levels (e.g., congestion metrics, etc.), the RX UE device may determine new SL DRX configuration, e.g., SL DRX reconfiguration information and/or SL DRX reconfiguration settings, for the SL group. For example, the SL DRX reconfiguration information may include information, settings, parameters, etc., related to the length of a new ON period for the SL DRX cycle to use for the remaining portion of the current SL DRX cycle; may determine assistance information for the TX UE devices of the SL group, etc., selected by the RX UE device but the example embodiments are not limited thereto. More specifically, the SL DRX reconfiguration information may include an indication of the length of the new ON period to use, such as an indication to use extended ON period #2 or extended ON period #3, etc., of FIG. 4, which may be determined by the RX UE device 120A or 120B based on the level of measured congestion, an instruction to use the next highest ON period, etc., but the example embodiments are not limited thereto.

As another example, the assistance information may include information useful in determining which SL resource to use by the TX UE devices 130A to 130C to transmit on, such as an indication of the number of UE members causing the group-specific congestion, which may be used by the TX UE devices 130A to 130C to randomize the timing of their transmissions (e.g., randomly select a T(k) window to use to transmit their SL data, select a particular T(k) among a set of T(k) for the SL group which satisfies a desired setting (e.g., a desired QoS requirement, etc.), such as a packet delay requirement and/or threshold based on the observed current and/or real-time group-specific SL congestion levels, etc.) over the time remaining in the reconfigured ON period to resolve congestion, etc., but the example embodiments are not limited thereto. Other examples of assistance information may include scheduling assignment information indicating a SL resource allocation, a SL resource pool assignment, a SL transmission window assignment (e.g., a specific T(k) window assignment) for one or more of the TX UE devices 130A to 130C, etc., but the example embodiments are not limited thereto.

Additionally, according to some example embodiments, particularly when a CO UE device determines the SL DRX reconfiguration information, but not limited thereto, the SL DRX reconfiguration information may further include instructions related to a desired start time and/or desired start SL DRX cycle to start using the extended ON period (e.g., start using the extended ON period during the current SL DRX cycle, start using the extended ON period during the next SL DRX cycle, etc.), a desired end time and/or desired end SL DRX cycle to end using the extended ON period, the length of time and/or number of SL DRX cycles that the reconfigured ON period is to be used for, etc., but the example embodiments are not limited thereto. For example, the SL DRX reconfiguration information may indicate that the extended ON period is to be used for only a single SL DRX cycle, may indicate that the extended ON period is to be used indefinitely (e.g., until a new SL DRX ON period is selected), that the extended ON period is to be used for a desired number of consecutive SL DRX cycles, and/or that the SL DRX cycle is to be used for a desired number of seconds, minutes, hours, etc., but the example embodiments are not limited thereto. Further, the SL DRX reconfiguration information may include the rules for resolving conflicting SL DRX reconfiguration settings received from two or more congestion detecting UE devices, etc. However, the example embodiments are not limited thereto, and in some example embodiments, these instructions may be provided in the initial SL DRX configuration information, common setting rules for the SL group and/or QoS level, etc., and therefore may be omitted from the SL DRX reconfiguration information, etc.

In operations S5050A and S5050B, the RX UE devices 120A and 120B may transmit (e.g., groupcast) the new SL DRX reconfiguration information to the SL group, such as TX UE devices 130A to 130C. According to at least one example embodiment, the UE devices may transmit using SL resources assigned to the SL group, wherein the SL resources may include a plurality of Physical Sidelink Feedback Channel (PSFCH) resources, a plurality of SL slots, a plurality of SL mini-slots, etc., but the example embodiments are not limited thereto. For example, the plurality of UE devices of the SL group may be sub-divided into subgroups, and each of the subgroups may be assigned to use a subset of the SL resources of the SL group to transmit SL messages, etc., and/or may be assigned a specific SL resource to transmit SL messages, etc. In at least one example embodiment, the SL DRX reconfiguration information may be transmitted over layer 1 (L1) signaling, e.g., as a SL DRX reconfiguration notification signal sent on one or more PSFCH resources assigned to the SL group and/or as an indication of the current ON duration included in SCI, and/or as a higher layer message and/or signal, such as a L2 Sidelink Medium Access Control (SL-MAC) control element (CE), a L3 Sidelink Radio Resource Control (SL-RRC) and/or Sidelink Signaling Protocol (SL-SP) message over one or more of the SL resources assigned to the SL group, etc., but the example embodiments are not limited thereto. According to some example embodiments, the RX UE devices 120A and 120B may transmit the new SL DRX reconfiguration information to the other UE devices at the end of the current T(k) period, e.g., T(1), at the beginning of a next T(k) period, e.g., T(2), of a current ON period of a current SL DRX cycle, at the end of the current SL DRX ON period of the current SL DRX cycle but before the beginning of a new SL DRX ON period of the current SL DRX cycle, e.g., at the end of the current ON period and before the beginning an increased ON period or decreased ON period, and/or at the beginning of the next SL DRX ON period of the next SL DRX cycle, etc., but the example embodiments are not limited thereto.

Additionally, according to at least one example embodiment, if the SL DRX reconfiguration information indicates that the length of the new ON period to use is to be extended ON period #2 or extended ON period #3, of FIG. 4, etc., and/or indicate that the new ON period should be increased to the next highest extended ON period, etc., the RX UE devices 120A and 120B may transmit the new SL DRX reconfiguration information using a single bit on, for example, a 1-bit L1 sequence, etc., thereby reducing the amount of data transmitted, etc.

In operations S5060A to S5060C, the TX UE devices 130A to 130C may adjust and/or update their respective SL DRX configuration settings based on the received SL DRX reconfiguration settings, including adjusting and/or updating the duration of the ON period, etc., but the example embodiments are not limited thereto. Additionally, if the received SL DRX reconfiguration settings conflict, for example, if the SL DRX reconfiguration information from RX UE 120A indicates that the ON period is to be increased to the extended ON period #2, and the SL DRX reconfiguration information from RX UE 120B indicates that the ON period is to be increased to the extended ON period #3 or the ON period #1 is to be maintained, then the TX UE devices 130A to 130C may use the SL DRX reconfiguration information indicating the longest ON period, etc., but the example embodiments are not limited thereto. Additionally, in the event that the RX UE device 120A and/or 120B determines that no change is desired and/or necessary for the ON period for the SL DRX cycle based on the results of the congestion level determination, the RX UE devices 120A and/or 120B may omit transmitting the SL DRX reconfiguration information to the SL group, etc.

Moreover, the TX UE devices 130A to 130C may also select and/or re-select the SL resources to use for the next SL transmission based on the SL DRX reconfiguration information. For example, the TX UE devices 130A to 130C may randomly select SL resources over the newly extended ON period indicated in the SL DRX reconfiguration information, may select the SL resources based on the assistance information included in the SL DRX reconfiguration information, e.g., the respective scheduling assignment, resource assignment, resource pool assignment, etc., for the TX UE device, etc., but the example embodiments are not limited thereto.

In operations S5070A to S5070C, the TX UE devices 130A to 130C may transmit new SCI and new SL data during the next T(k) period of the current ON period, or if the ON period has expired, may transmit the new SCI and new SL data during the first T(k) period of the next ON period, etc., based on the SL DRX reconfiguration information. Additionally, the SCI may include an indication of the current ON period (e.g., the current ON period identifier, the current ON period duration, etc.).

FIG. 6 illustrates an example transmission flow diagram for using a TX UE device to determine SL congestion levels and/or determine SL DRX reconfiguration settings for a SL group according to at least one example embodiment.

Operations S6010, S6020, S6030, and S6070 of FIG. 6 are similar to operations S5010, S5020, S5030, and S5070 of FIG. 5, therefore detailed description of these operations will be omitted for the sake of clarity and brevity.

According to at least one example embodiment, in operation S6010, the UE devices of a desired SL group (and/or a desired SL QoS level of the wireless network) may obtain, receive, and/or be otherwise pre-configured with the initial SL groupcast configuration information (e.g., including the initial SL DRX configuration and setting rules, etc.), but are not limited thereto. In operations S6020A to S6020C, each of the TX UE devices 130A to 130C may determine whether they respectively have new SL data to transmit to the desired SL group at the beginning of the next T(k) period of the current ON period of the current SL DRX cycle. In operations S6030A to S6030C, the TX UE devices 130A to 130C may transmit a SCI and the SL data to each of the RX UE devices of the SL group, e.g., RX UE devices 120A and 120B in FIG. 6, etc., but the example embodiments are not limited thereto. Additionally, the SCI may include an indication of the current ON period, etc.

In operations S6040A to S6040C, the TX UE devices 130A to 130C may monitor, measure, and/or determine the dynamic, real-time, and/or current transmission-related congestion information, such as monitoring SL hybrid automatic repeat request (HARQ) feedback to determine HARQ failures from the UE members of the SL group. For example, the TX UE devices 130A and 130B may receive SL HARQ negative acknowledgement (NACK) messages from at least one RX UE device of the SL group, the SL HARQ NACK messages indicating that the RX UE device failed to decode a previously transmitted transport block (TB) carrying the SL data, etc., etc. As a second example, in operation S6040C, the TX UE device 130C may determine that it has experienced a HARQ discontinuous transmission (DTX) condition, e.g., the TX UE device 130C has received no SL HARQ ACK and/or SL HARQ NACK messages in response to its previously transmitted SL data transmission, etc., but the example embodiments are not limited thereto.

In operations S6050A to S6050C, each of the TX UE devices 130A to 130C may individually determine whether the measured transmission-related congestion information exceeds desired congestion threshold levels for the SL group. For example, the TX UE devices 130A to 130C may determine whether a number of consecutive HARQ failures (e.g., the number of NACK messages received from at least one UE device on the last HARQ retransmission, etc.) exceeds a desired threshold level for number of consecutive HARQ failures, and/or the TX UE devices 130A to 130C may determine whether consecutive HARQ DTX conditions have been experienced by a desired threshold number of TX UE devices of the SL group, etc., but the example embodiments are not limited thereto. Additionally, according to some example embodiments, the values for the desired threshold settings may be determined based on, for example, at least one of the CBR of the SL resources, the group size of the SL group, the remaining duration of the current ON period, the QoS parameters assigned for the SL group, etc., or any combinations thereof, but the example embodiments are not limited thereto.

Further, in the event that one or more of the TX UE devices 130A to 130C determines that the transmission-related congestion levels has exceed a desired transmission-related congestion threshold level, the TX UE device may determine adjusted and/or updated SL DRX configuration information (e.g., SL DRX reconfiguration information and/or SL DRX reconfiguration settings, etc.) for the SL group. Additionally, because the TX UE devices 130A to 130C already know that they will be transmitting new SL data during the next T(k) period of the current ON period and/or the first T(k) period of the next ON period, the TX UE devices 130A to 130C may implement the SL DRX reconfiguration settings, including selecting and/or re-selecting SL resources to transmit on using the SL DRX reconfiguration settings, etc.

Additionally, in operations S6060A to S6060C, the TX UE devices 130A to 130C may transmit the SL DRX reconfiguration settings to each of the other UE devices of the SL group, etc. The SL DRX reconfiguration settings may be transmitted as a SL DRX reconfiguration notification signal and/or as an indication of the current ON period in SCI over L1, but the example embodiments are not limited thereto.

As discussed above in FIG. 5, if any of the UE devices of the SL group receives SL DRX reconfiguration settings which conflict with each other, for example, if the SL DRX reconfiguration settings prepared by TX UE device 130A indicates that extended ON period #2 is to be used, while the SL DRX reconfiguration settings prepared by TX UE device 130B indicates that extended ON period #3 is to be used, the UE devices of the SL group may use the SL DRX reconfiguration setting indicating the longest ON period, etc., but the example embodiments are not limited thereto.

In operations S6070A to S6070C, the TX UE devices 130A to 130C may transmit new SCI and new SL data during the next T(k) period of the current ON period, or if the ON period has expired, may transmit the new SCI and new SL data during the first T(k) period of the next ON period, etc., based on the SL DRX reconfiguration information. Additionally, the SCI may include an indication of the current ON period.

FIG. 7 illustrates an example transmission flow diagram for using a CO UE device to determine SL congestion levels and/or determine SL DRX reconfiguration settings for a SL group according to at least one example embodiment. According to at least one example embodiment, and dissimilar from the example embodiments discussed in connection with FIGS. 5-6, the SL DRX system of FIG. 7 includes a CO UE device 140 which monitors the congestion level of the SL group and determines the SL DRX reconfiguration settings based on the monitor congestion levels, etc.

Operations S7010, S7020, S7040, and S7070 of FIG. 7 may be similar to operations S5010, S5020, S5030, S5040, and S5070 of FIG. 5 and/or operations S6010, S6020, S6030, S6050, and S6070 of FIG. 6, therefore detailed description of these operations will be omitted for the sake of clarity and brevity.

According to at least one example embodiment, in operation S7010, the UE devices of a desired SL group (and/or a desired SL QOS level of the wireless network) may obtain, receive, and/or be otherwise pre-configured with the initial SL groupcast information (e.g., including the initial SL DRX configuration and setting rules, etc.), but are not limited thereto. In operations S7020A to S7020C, each of the TX UE devices 130A to 130C may determine whether they respectively have new SL data to transmit to the desired SL group at the beginning of the next T(k) period of the current ON period of the current SL DRX cycle. According to some example embodiments, the CO UE device 140 may perform RX and/or TX during an ON period of a SL DRX cycle, and therefore the CO UE device 140 may measure either RX-related congestion levels, TX-related congestion levels, or both, as discussed above in connection with FIGS. 5-6, but is not limited thereto.

However, in other example embodiments, as shown in operations S7030A to S7030C of FIG. 7, each of the TX UE devices 130A to 130C may transmit a SL TX announcement to the CO UE device 140, but the example embodiments are not limited thereto. In operations S7030A to S7030C, at the beginning of the next T(k) period, e.g., T(1), of the current ON period of the current SL DRX cycle, the TX UE devices 130A to 130C may transmit a transmission announcement signal to the CO UE device 140 of the SL group indicating that the TX UE devices 130A to 130C have new data to transmit to the SL group during the next T(k) period, e.g., T(k+1), but the example embodiments are not limited thereto. In at least one example embodiment, the transmission announcement may be a 1-bit L1 message (e.g., a L1 preamble and/or sequence), but the example embodiments are not limited thereto.

According to some example embodiments, each of the TX UE devices 130A to 130C may transmit the 1-bit data indication signal using a dedicated SL announcement resource reserved for transmitting the transmission announcements by the members of the SL group, e.g., a dedicated PSFCH, a dedicated SL slot, a dedicated SL mini-slot, etc., but the example embodiments are not limited thereto. In at least one other example embodiment, the TX UE devices may transmit the transmission announcement signal on one or more common SL resources (e.g., a plurality of SL resources assigned to the SL group, a subset of the SL resources assigned to the SL group, etc.), etc., instead of using a dedicated SL resource. As a first example, the plurality of TX UE devices may transmit the transmission announcement signal on a common SL resource of the SL group at the beginning of each T(k). As a second example, the plurality of UE devices of the SL group may be subdivided into subgroups, and each of the subgroups may be assigned to use a subgroup specific common SL resource of the SL group at the beginning of each T(k) to transmit the transmission announcement signal, etc., but the example embodiments are not limited thereto. In these examples, more than one TX UE devices of the SL group may transmit the transmission announcement signal in the common SL resource simultaneously, resulting in a single-frequency-network transmission at the CO UE device 140, etc., but the example embodiments are not limited thereto.

Additionally, according to some example embodiments, instead of transmitting a transmission announcement to the CO UE device 140, the TX UE devices 130A to 130C may transmit a SL coordination request to the CO UE device 140, but the example embodiments are not limited thereto. The SL coordination request may include a request for resolution related to SL resources among the TX UE devices of the SL group, and for example, may further include the scheduled resources for SL transmissions selected by the TX UE device and/or a buffer-status report for the TX UE device, etc., but the example embodiments are not limited thereto.

In operation S7040, the CO UE device 140 may monitor, measure, and/or determine the group-specific congestion level based on the received SL transmission announcements and/or the SL coordination requests and may determine whether the group-specific congestion level exceeds at least one desired congestion threshold level, etc. For example, if each of the TX UE devices 130A to 130C use different dedicated SL resource to transmit the transmission announcement, the CO UE device 140 may count the number of transmission announcements received to determine the congestion level of the SL group for the next ON period, etc. As another example, if each of the TX UE devices 130A to 130C share the same common SL resource of the SL group to transmit the transmission announcement, the CO UE device 140 may determine the received signal power level of the transmission announcement signal on the common SL resource and then estimate the number of TX UE devices transmitting transmission announcements based on the received signal power level (e.g., the higher the measured received signal power level, the higher the number of transmission announcements being received on the dedicated SL resource, etc.). As a third example, if the TX UE devices 130A to 130C are sub-divided into subgroups and each of the TX UE devices of each subgroup uses a single common SL resource of the SL group, then the CO UE device 140 may determine the received signal power level for each of the plurality of common SL resources of the SL group to determine the congestion level of the SL group, but the example embodiments are not limited thereto.

Once the CO UE device 140 determines the congestion level of the SL group, the CO UE device 140 may determine whether congestion level of the SL group exceeds a desired congestion level threshold, etc. For example, the CO UE device 140 may determine whether the number of TX UE devices desiring to perform SL transmission during the current or next ON period exceeds a desired threshold based on the count of transmission announcements and/or the received signal power levels, etc., the CO UE device 140 determines new, updated, and/or adjusted SL DRX configuration information, e.g., SL DRX reconfiguration information, for the SL group. Additionally, according to some example embodiments, the values for the desired threshold settings may be determined based on, for example, at least one of the CBR of the SL resources, the group size of the SL group, the remaining duration of the current ON period, the QoS parameters assigned for the SL group, etc., or any combinations thereof, but the example embodiments are not limited thereto.

Additionally, according to some example embodiments, the CO UE device 140 may also determine the assistance information for the TX UE devices of the SL group, etc., as discussed in connection operations S5040A and S5040B of FIG. 5, but the example embodiments are not limited thereto. In operation S7050, the CO UE device 140 transmits (e.g., groupcasts) the SL DRX reconfiguration information to each of the other UE devices of the SL group, etc. The SL DRX reconfiguration settings and the assistance information may be transmitted together or separately using L1, L2 and/or L3 message(s), but the example embodiments are not limited thereto. According to some example embodiments, the CO UE device 140 may transmit the new SL DRX reconfiguration information to the other UE devices at the end of the current T(k) period, e.g., T(1), at the beginning of a next T(k) period, e.g., T(2), of a current ON period of a current SL DRX cycle, at the end of the current SL DRX ON period of the current SL DRX cycle but before the beginning of a new SL DRX ON period of the current SL DRX cycle, e.g., at the end of the current ON period and before the beginning an increased ON period or decreased ON period, and/or at the beginning of the next ON period of the next SL DRX cycle, etc., but the example embodiments are not limited thereto.

In operations S7060A to S7060C, the RX UE device 120 and the TX UE devices 130A to 130C may adjust and/or update their respective SL DRX configuration settings based on the received SL DRX reconfiguration settings, including adjusting and/or updating the duration of the ON period, etc., but the example embodiments are not limited thereto.

Moreover, the TX UE devices 130A to 130C may also select and/or re-select the SL resources to use for the next SL transmission based on the SL DRX reconfiguration information. For example, the TX UE devices 130A to 130C may randomly select SL resources over the newly extended ON period indicated in the SL DRX reconfiguration information (e.g., the TX UE devices may randomize the timing for the next SL transmissions during a remaining portion of the extended SL DRX ON period), may select the SL resources based on the assistance information included in the SL DRX reconfiguration information, e.g., the respective scheduling assignment, resource assignment, resource pool assignment, etc., for the TX UE device, etc., but the example embodiments are not limited thereto.

In operations S7070A to S7070C, the TX UE devices 130A to 130C may transmit new SCI and new SL data during the next T(k) period of the current ON period, or if the ON period has expired, may transmit the new SCI and new SL data during the first T(k) period of the next ON period, etc., based on the SL DRX reconfiguration information. Additionally, the SCI may include an indication of the current ON period.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A user equipment (UE) device comprising:
a memory storing computer readable instructions; and
processing circuitry configured to execute the computer readable instructions to cause the UE device to:
obtain sidelink (SL) groupcast configuration information associated with a desired UE group, the SL groupcast configuration information including a SL discontinuous reception (DRX) cycle and a setting rule regarding the SL DRX cycle for the desired UE group, the SL DRX cycle including a SL DRX ON duration setting, the desired UE group including a plurality of UE devices including the UE device, wherein:
each respective UE device of the desired UE group is associated with a dedicated SL resource,
the desired UE group is associated with a common set of SL resources,
the desired UE group includes a plurality of sub-groups, and each respective sub-group of the plurality of sub-groups is associated with a SL resource of the common set of SL resources, and
the setting rule regarding the SL DRX cycle indicates setting the SL DRX ON duration setting for the next SL DRX cycle to an initial SL DRX ON duration setting and maintaining an increased SL DRX ON duration setting for a desired number of next SL DRX cycles;
determine whether a congestion level of the desired UE group for a current SL DRX cycle period exceeds a desired congestion threshold level by:
monitoring reception-related congestion information associated with the plurality of UE devices of the desired UE group,
determining whether the reception-related congestion information exceeds a desired reception-related congestion threshold level by:
determining whether the reception-related congestion information indicates a number of the UE devices of the desired UE group transmitting simultaneously in a same slot of a current SL DRX ON duration exceeds a desired number of simultaneous SL transmissions in the same slot, and
determining whether the reception-related congestion information indicates a desired number of unsuccessful SL receptions has been observed by the UE device during the current SL DRX ON duration,
monitoring transmission-related congestion information associated with the plurality of UE devices of the desired UE group, and
determining whether the transmission-related congestion information exceeds a desired transmission-related congestion threshold level by:
determining whether the transmission-related congestion information indicates a number of hybrid automatic repeat request (HARQ) failures during the current SL DRX ON duration exceeds a desired number of consecutive HARQ failures has been observed by the UE device, and
determining whether the transmission-related congestion information indicates consecutive HARQ discontinuous transmissions (DTXs) received from the UE devices of the desired UE group during a failed HARQ process exceeds a desired number of UE devices,
wherein the desired congestion threshold level is further determined based on a channel busy ratio of sidelink resources, a size of the desired UE group, a remaining duration of the current SL DRX ON duration, and quality-of-service parameters assigned to the desired UE group;
determine SL DRX reconfiguration settings, based on results of the determining whether the congestion level exceeds the desired congestion threshold level and the setting rule, by:
increasing a current SL DRX ON duration setting to a new SL DRX ON duration setting for the current SL DRX cycle in response to the congestion level exceeding the desired congestion threshold level, wherein the increasing the current SL DRX ON duration setting to the new SL DRX ON duration setting comprises: selecting, based on the determined congestion level, one of a plurality of predefined extended SL DRX ON duration settings longer than an initial SL DRX ON duration setting, or
determining the SL DRX ON duration setting for a next SL DRX cycle based on the setting rule regarding the SL DRX cycle for the desired UE group;
perform SL DRX communication based on the determined SL DRX reconfiguration settings by:

transmitting the SL DRX communication with a randomized timing during a remaining portion of the SL DRX ON duration setting of the current SL DRX cycle, receiving assistance information from a coordinating UE device of the desired UE group, the assistance information including: a scheduling assignment, a resource pool assignment, a transmission time window assignment, and an indication of a number of UE devices causing congestion in the desired UE group, and transmitting the SL DRX communication during a remaining portion of the SL DRX ON duration setting of the current SL DRX cycle based on the assistance information, wherein transmitting the SL DRX communication based on the assistance information comprises randomly selecting one of a plurality of transmission time windows during the remaining portion of the SL DRX ON duration based on the indicated number of UE devices causing congestion;

transmit the determined SL DRX reconfiguration settings to the plurality of UE devices of the desired UE group:

in a layer 1 (L1) sidelink control information (SCI) or in a higher layer signaling message to the desired UE group, and at a desired point in time, the desired point in time being an end of a current transmission time window, a beginning of a next transmission time window, an end of a current SL DRX ON duration and before a beginning of a new SL DRX ON duration, and a beginning of a next SL DRX ON duration, wherein transmitting the determined SL DRX reconfiguration settings comprises transmitting a one-bit Layer 1 sidelink sequence indicating that the current SL DRX ON duration setting is to be increased to a next higher extended SL DRX ON duration setting;

in response to receiving conflicting SL DRX reconfiguration settings from two or more congestion-detecting UE devices of the desired UE group, selecting one of the conflicting SL DRX reconfiguration settings that indicates a longest SL DRX ON duration;

monitor SL transmission announcements from at least one transmitting UE device of the desired UE group, the SL transmission announcements transmitted over the dedicated SL resource associated with the at least one transmitting UE device, wherein the SL transmission announcements comprise one-bit Layer 1 transmission announcement signals transmitted at a beginning of a current transmission time window to indicate that corresponding transmitting UE devices have data to transmit during a next transmission time window;

monitor SL announcements from at least one transmitting UE device of the desired UE group, the SL announcements transmitted over the common set of SL resources associated with the desired UE group;

estimate a first congestion level based on a received power level of the monitored SL announcements;

monitor SL announcements from at least one transmitting UE device of each sub-group of the plurality of sub-groups, the SL announcements transmitted over the SL resource associated with each sub-group, respectively;

estimate a congestion level for each sub-group based on a received power level of the monitored SL announcements for the SL resource associated with each sub-group;

receive SL coordination requests from at least one transmitting UE device of the desired UE group;

determine the congestion level of the desired UE group exceeds the desired congestion threshold level based on:

a number of received SL announcements exceeding a desired number of received SL announcements, the estimated first congestion level, the estimated congestion levels of the plurality of sub-groups of the desired UE group, and the received SL coordination requests; and randomly selecting one or more SL resources over the increased SL DRX ON duration based on the determined SL DRX reconfiguration settings.

* * * * *